(12) United States Patent
Seidel et al.

(10) Patent No.: US 7,223,471 B2
(45) Date of Patent: May 29, 2007

(54) POLYTRIMETHYLENE TEREPHTHALATE RESINS WITH IMPROVED PROPERTIES

(75) Inventors: Eckhard Seidel, Frankfurt (DE); Bernd Gemmel, Gelnhausen (DE); Karl-Heinz Heldmann, Raunheim (DE)

(73) Assignee: Zimmer AG, Frankfort (DE)

( * ) Notice: Subject to any disclaimer, the term of this patent is extended or adjusted under 35 U.S.C. 154(b) by 52 days.

(21) Appl. No.: 10/508,596

(22) PCT Filed: Feb. 20, 2003

(86) PCT No.: PCT/EP03/01707

§ 371 (c)(1),
(2), (4) Date: Sep. 22, 2004

(87) PCT Pub. No.: WO03/080701

PCT Pub. Date: Oct. 2, 2003

(65) Prior Publication Data

US 2005/0143556 A1 Jun. 30, 2005

(30) Foreign Application Priority Data

Mar. 23, 2002 (EP) .................................. 02006746

(51) Int. Cl.
*D02G 3/00* (2006.01)

(52) U.S. Cl. ...................... 428/365; 428/221; 428/364; 428/370; 524/81; 524/115; 524/116; 524/123; 524/126; 524/127; 524/128; 524/174; 524/204; 524/284; 525/56; 525/437; 525/444; 528/495; 528/496; 528/503

(58) Field of Classification Search ................... 524/81, 524/115, 116, 123, 126, 127, 128, 175, 204, 524/284; 428/364, 365, 370, 221; 528/495, 528/496, 503; 525/56, 437, 444
See application file for complete search history.

(56) References Cited

U.S. PATENT DOCUMENTS

| 4,670,498 | A  | * | 6/1987  | Furusawa et al. ........... 524/381 |
| 5,459,229 | A  | * | 10/1995 | Kelsey et al. ............... 528/275 |
| 5,798,433 | A  | * | 8/1998  | Schmidt et al. ............. 528/279 |
| 6,093,786 | A  | * | 7/2000  | Kelsey ........................ 528/271 |
| 6,242,558 | B1 | * | 6/2001  | Kelsey ........................ 528/206 |
| 6,326,456 | B2 | * | 12/2001 | Kelsey et al. ............... 528/279 |
| 6,509,438 | B2 | * | 1/2003  | Kelsey et al. ............... 528/279 |
| 6,867,322 | B1 | * | 3/2005  | Kato et al. .................... 560/78 |
| 2002/0010310 | A1 |   | 1/2002  | Allen et al. ................. 528/275 |
| 2003/0004244 | A1 | * | 1/2003  | Al-Malaika ................. 524/386 |

FOREIGN PATENT DOCUMENTS

| EP | 0 943 649 A2   | 9/1999  |
| EP | 1 142 955 A1   | 10/2001 |
| WO | WO 01/81447 A2 | 11/2001 |
| WO | WO 02/051616 A2 | 7/2002 |

\* cited by examiner

*Primary Examiner*—Terressa Boykin
(74) *Attorney, Agent, or Firm*—McDonnell Boehnen Hulbert & Berghoff LLP

(57) ABSTRACT

A composition comprising Polytrimethylene terephthalate (PTT) with a reduced emission of acrolein is obtained by contacting Polytrimethylene terephthalate (PTT) resin with an effective amount of a melt stable, organic stabilizing compound. Such PTT resin has an acrolein formation rate at 280° C. of less than 15 ppm/minute. Preferably the residual acrolein content of the PTT resin is less than 10 ppm. The additive organic stabilizing compounds are free from nitrogen atoms. Preferred additive compounds include polyfunctional alcohols, alcoholates, aromatic carboxylic acid anhydrides, carboxylic acids and salts of carboxylic acids. The additive compounds are added to the polymer in molten state and/or to the resin, which is then processed to fibers, filaments, non-wovens, films and/or mouldings.

22 Claims, No Drawings

POLYTRIMETHYLENE TEREPHTHALATE RESINS WITH IMPROVED PROPERTIES

The present invention relates to polytrimethylene terephthalate (PTT) resins having a low contaminants formation rate and a low content of residual contaminants, to a method for the production of such resins and to articles obtained from said resins.

In general the polytrimethylene terephthalate resins used for the production of filaments, fibers and spin-fleeces for carpets, textile goods (wear, room textiles, technical textiles), further for the production of films and plastic materials have intrinsic viscosities usually above 0.75 dl/g. Resins with these values are obtained either by an all-melt polycondensation process of terephthalic acid or dimethylterephthalate with propanediol or by a two step process of melt and solid state polycondensation process, whereas in the first polycondensation reaction the intrinsic viscosity generally does not reach values higher than 0.6–0.7 dl/g and the resin viscosity has to be increased by solid-state polycondensation (SSP).

The all-melt process e.g. is performed as set forth in U.S. Pat. No. 6,277,947, a melt plus SSP process e.g. is disclosed in WO 97/23543.

The SSP reaction is performed by heating the pellets of the resin, after its crystallization, to a temperature from about 180° to 230° C. in a stream of inert gas (nitrogen or others) for a time sufficient to obtain the intended IV value.

Extrusion of the resin from the all-melt processes to obtain the pellets to be subjected to SSP is generally performed in air. Resin processing to obtain the various articles is also performed in air.

During resin pelletizing and treatment steps such as extrusion of the chips to spin filaments, fibers and fleeces for carpets, textile goods (wear, room textiles, technical textiles) and further to produce films and plastic materials, contaminants are generated in considerable amounts.

Amongst the contaminants acrolein plays an important role. The residual acrolein content of the products can exceed up to 50 ppm and the acrolein formation rate, measured at 280° C., can be higher than 30 ppm/minute.

The presence of acrolein, like the presence of other contaminants, negatively affects the application of PTT products, specifically in presence of temperatures higher than 60° C.

Accordingly, it is desirable to have the lowest possible acrolein content in the resin that is used in human environment.

It is also desirable for articles which do not make contact with wear and room textiles to have a low residual acrolein content.

In order to obtain articles having a low residual acrolein content, the initial resin must be characterized not only by a low acrolein content but also and preferably by a low rate of acrolein formation at the process temperatures used to prepare the articles and at the thermal conditions of their application, i.e. during concentrated exposure to the sun's rays, ironing or drying processes.

Methods are known for obtaining polytrimethylene terephthalate resins with a low acrolein formation rate. It was found that PTT thermal stabilizers and antioxidants reduce the formation of acrolein in PTT when heated/aged in air as disclosed by U.S. Pat. No. 6,093,786 and U.S. Pat. No. 6,242,558. But PTT comprising these additives is deemed to involve the drawback of showing a considerable residual acrolein formation rate at ambient temperatures.

EP-A 1 142 955 discloses a titanium oxide-containing PTT resin composition. A PTT containing titanium oxide has the problem that the PTT forms large amounts of acrolein and allyl alcohol in comparison with PTT without titanium oxide. Therefore, in EP-A 1 142 955 the polycondensation is carried out in presence of a phosphorous compound and/or a hindered phenol in order to inhibit the generation of by products such as acrolein and allyl alcohol.

The generation of dipropylene glycol as a pre product of acrolein during PTT fabrication can be reduced by addition of basic metal salts to the reaction mixture before or during the polycondensation (US 2002/010310 A1).

In WO 01/81447 a PTT polymer is disclosed with reduced amounts of dipropylene glycol monomer units. This composition is obtained without addition of any stabilizers and when heated in air, it has a reduced tendency to generate acrolein.

WO 00/58393 discloses melt stable aliphatic and aromatic amines and amides as stabilizing additives for 3-hydroxypropanoxy terminated polymers which reduce the emission of acrolein from such polymers (e.g. PTT).

Surprisingly it has been found that the emission of acrolein from a Polytrimethylene terephthalate (PTT) resin can be reduced by a composition comprising Polytrimethylene terephthalate (PTT), wherein the composition is obtainable by contacting molten Polytrimethylene terephthalate (PTT) resin with an effective amount of a melt stable, organic stabilizing compound. Such compound is selected from the group comprising polyfunctional alkohols, alcoholates, anhydrides of carboxylic acids, carboxylic acids and their salts, carbohydrates and derivatives of carbohydrates.

A melt stable, organic stabilizing compound in the idea of the present invention does not contain any nitrogen atoms, in contrast to the melt stable nitrogen containing compounds disclosed in WO 00/58393.

The term melt stable means that said organic stabilizing compound does not decompose at usual temperatures of a PTT melt during processing of about 250–280° C. The stability of said compounds is not determined in the PTT melt itself but by usual analytical methods (e.g. kofler hot bench). Such methods and physical data of said compounds are generally known from literature (e.g. Handbook of Chemistry and Physics, $83^{th}$ edition, CRC Press, Boca Raton, 2002).

According to the invention there is provided for the first time a polytrimethylene terephthalate (PTT) resin composition having an acrolein formation rate at 280° C. of less than 15 ppm/minute, preferably lower than 1 ppm/minute and particularly lower than 0.1 ppm/min. The PTT resin composition of the invention advantageously is characterized by a low acrolein content <10 ppm, preferred <1 ppm and most preferred <0.1 ppm.

The said compound can be added to the PTT either when the PTT is in the molten state or when the PTT is in the solid state, provided that the solid state PTT is processed thereafter through the molten state, thereby allowing for a thorough mixing of PTT and additive.

The amount of compound to be added to the PTT may vary over a broad range. It is preferred, however, that the compound is added in an amount of 10–30.000 ppm based on the total weight of the PTT.

The behavior of the polytrimethylene terephthalate resins comprising substances according to the present invention is unusual with respect to the formation of acrolein, since the compounds usually added to PTT as stabilizers and antioxidants do not result in a limitation of the acrolein content or the formation rate of acrolein.

It is known that thermal stabilizers and antioxidants in an amount in the range from 0.1 to 1% by weight are added to the Polytrimethylene terephthalate resin during the preparation of said resin in the esterification or transesterification step or in the subsequent step of polycondensation in the melt. Widely used thermal stabilizers for the purpose of stabilization embrace e.g. phosphorous compounds. Widely used antioxidants encompass e.g. hindered phenols.

It is known from U.S. Pat. No. 6,093,786 and U.S. Pat. No. 6,242,558 that the generation of acrolein in the destillate streams during the polymerization of PTT is reduced when an organo-phosphite thermal stabilizer is added during the reaction and also that the addition of a hindered phenolic antioxidant to PTT results in a polymer which is lower in color and less likely to generate acrolein when heated/aged in air. The resulting PTT resins have acrolein concentrations of >10 ppm in the PTT.

U.S. Pat. No. 6,326,456 discloses phosphorous compounds, hindered phenolic esters and organophosphites as stabilizers which stop the catalysis of the thermal degradation of PTT melt by ions of heavy metals.

Using the compounds in accordance with the present invention in concentrations of 10 to 30.000 ppm related to the polymer the concentration of acrolein in the pellets can be reduced to <10 ppm preferably <1 ppm and most preferred <0.1 ppm.

The compounds preferably are added to the PTT melt before pelletizing. These compounds reduce the content of acrolein in the PTT after re-extrusion of the chips and spinning to fibers or processing to other application products. It was found that the effect of the said compounds continued also under solid conditions and the acrolein content in the chips, fibers and other application products still decreased.

Heating the PTT products the acrolein formation rate dramatically is lowered as well.

It was found that melt stable polyfunctional alcohols and alcoholates are capable of reducing the emission of acrolein. Preferred examples of these compounds are selected from the group consisting of trishydroxy-methylpropane, pentaerythrite, sorbitol, polyvinylalkohol and aluminium-methanolate.

In another embodiment the compound to be added is selected from the group consisting of anhydrides of carboxylic acids, carboxylic acids and salts of carboxylic acids. Preferred anhydrides are anhydrides of aromatic carboxylic acids. Preferred examples of such compounds are selected from the group consisting of phthalic anhydride, isophthalic anhydride and pyromellitic dianhydride. A preferred salt of a carboxylic acid is zinc-acetate.

It was also found that carbohydrates and derivatives of carbohydrates can surprisingly reduce the emission of acrolein.

It should be noted that all of the above additives can be used singly or in a mixture of two or more compounds.

In this connection it was surprisingly found that a combination of an alkoholate and an anhydride of a carboxylic acid can synergistically reduce the emission of acrolein from a PTT resin. In a preferred embodiment, a combination of aluminium-methanolate and phthalic anhydride is added.

It was also found that a combination of an alkoholate and a polyfunctional alcohol can synergistically reduce the emission of acrolein from a PTT resin. In a preferred embodiment, a combination of aluminium-methanolate and pentaerythrite is added.

Said compounds preferably are added to the resin in the melt by mixing before pelletizing or in an extruder before forming moldings or fibers or before subjecting the resin to the SSP step.

The treatment of the resin in the molten state can be advantageously performed in an inert-gas atmosphere (nitrogen), for example by passing a stream of inert gas flow in the environment in which preparation of the articles occurs. It is also possible to work in air, but less satisfactory results are obtained.

It has been found, and it is, a further aspect of the invention, that it is possible to avoid coloring problems due to the presence of the compounds in accordance with the present invention in the melt or when the solid resin is subjected to SSP at a temperature above 180° C. or when the solid resin is re-extruded before forming moldings and fibers by using these compounds in combination with thermal stabilizers and antioxidants.

As already indicated, the antioxidants can be used in combination with the said acrolein converting compounds can be used in the process according to the present invention.

The antioxidants preferably include phosphites having the formula $P(OR')_3$, whereas R are identical or different and are alkyl or aryl groups. It is also possible to use phosphates having the formula $OP(OR)_3$, whereas R has the above mentioned meaning.

Diphosphite compounds such as "Ultranox 626" or "Ultranox 627" (Brand names of compounds marketed by General Electric Specialty Chemicals) are preferred.

Especially preferred are phosphonic acid derivatives of the formula Z—R—$(PO)(OH)_2$ with $R=(CH_2)_n$ and $n=1-6$ and Z=COOH, OH or $NH_2$.

Other antioxidants which can be used are phenolic antioxidants, such as hindered phenolic compounds, for example the compound "Irganox 1010" or "Irganox 1076" by Ciba-Geigy or the compounds as discussed in U.S. Pat. No. 6,093,786 and U.S. Pat. No. 6,242,558.

The PTT can comprise up to 20% other monomer units as naphthalene dicarbonic acid or hydroxybenzoic acid or other diols as butanediol or ethanediol or cyclohexanediol.

In accordance with the present invention also polymer blends up to 20 wt. -% with other polyesters or combinations of them as polybutylene terephthalate, polyethylene terephthalate, polyethylene naphthalate and/or copolyethylene terephthalate can be used as PTT resins.

Resins with a low acrolein formation rate and low acrolein content having an intrinsic viscosity of more than 0.75 dl/g and being obtained in an all-melt process or by additional solid stating are particularly suitable for the production of filaments, fibers and spin-fleeces for carpets, textile goods (wear, room textiles, technical textiles), further for the production of films and plastic materials and for any other application which requires a low acrolein content and a low acrolein formation rate.

The following examples are given by way of non-limitative illustration of the invention.

Analytical Methods

Acrolein Content by Headspace-GC 1 g of PTT polymer which has been ground in liquid nitrogen is heated in a closed vial under nitrogen atmosphere at 150° C. for 30 minutes. From the vapour space of the vial a sample is taken and transferred to a gas chromatograph equipped with a flame ionization detector for analysis of the acrolein content.

Acrolein Formation by Thermodesorption-GC

Prior to analysis PTT polymer is ground in liquid nitrogen. A sample of 200 mg is heated in a nitrogen stream at 280° C. for 12 minutes. The nitrogen-stream is passed through a trap filled with TENAX (reg. trade mark) where the organic components are removed from the stream. After the specified time the organic load is removed from the trap by rapid temperature increase transferred by a nitrogen stream to a gas chromatograph (FID) where it is further analyzed.

Intrinsic Viscosity (IV)

125–145 mg polymer are weighed into a cylindrical dissolution vessel, 25 ml phenol/1,2 dichlorbenzene (60:40 w.w.) is added. The sample is stirred 20 min. at 135° C. and cooled down. The IV of the solution is measured in an Ubbelohde viscosimeter at 25° C.

EXAMPLES

1. PTT Chips were dried (10 h, 130° C.), mixed with the powder of the melt stable organic compound capable of chemically reacting and thereby removing acrolein, extruded by a Husmann Extruder Model ES 30, throughput 6 kg/h at 260° C. The melt passed a 9 element mixing line (DN15 SMX, Sulzer) within 4 min. and was spun out to strand. The strand was cooled by a 2 m long waterbath and granulated by a Scheer lab cutter to PTT chips. The chips were dried (10 h, 130° C.) and prepared to analyze the acrolein content.
2. Comparison example, chip PTT chips without the additives of the present invention were re-extruded under the same conditions as described in example 1 and prepared to analyze the acrolein content.
3. Re-extruded grounded PTT samples of pellets were filled in the desorption apparatus to desorb and analyze the acrolein. The following table shows the results of the analysis:

| Sample | Acrolein desorption from original chips [ppm/12 min] | Acrolein desorption from reextruded chip/fiber [ppm/12 min] | Acrolein reduction [%] |
|---|---|---|---|
| Sample1 | 420 | 415 | none |
| Sample1 + 0.1% phthalic anhydride | — | 320 | 23 |
| Sample1 + 0.1% phthalic anhydride + 0.01% Al-methanolate | — | 162 | 61 |

4. The PTT samples were analysed by the Headspace GC-Method to detect acrolein concentration in the reextruded polymer. The following table shows the results:

| Sample | Acrolein concentration in the reextruded chips [ppm] | Acrolein reduction related to sample1 [%] |
|---|---|---|
| Sample1 | 26 | none |
| Sample1 + 0.1% trishydroxy-methylpropane | 18 | 31 |
| Sample1 + 0.1% D-sorbitol | 19 | 27 |
| Sample1 + 0.1% polyvinyl-alcohol | 20 | 23 |
| Sample1 + 0.1% zincacetate | 18 | 31 |
| Sample1 + 0.1% phthalic anhydride | 18 | 31 |
| Sample1 + 0.1% pentaerythrite | 18 | 31 |
| Sample1 + 0.1% Al-methanolate | 8 | 69 |
| Sample1 + 0.01% Al-methanolate | 20 | 23 |
| Sample1 + 0.1% pentaerythrite + 0.01% Al-methanolate | 9 | 65 |
| Sample1 + 0.1% phthalic anhydride + 0.01% Al-methanolate | 12 | 54 |

5. Repeating of Headspace GC-Method with some samples to analyze acrolein in the PTT Chips after storage of the samples at 25° C.:

| Sample | Storage time [days] | Acrolein concentration in the reextruded chips after storage [ppm] | Acrolein reduction related to sample1 [%] |
|---|---|---|---|
| Sample1 | 0 | 26 | none |
| Sample1 | 7 | 26 | none |
| Sample1 + 0.1% trishydroxy-methylpropane | 7 | 14 | 46 |
| Sample1 + 0.1% pentaerythrite | 7 | 16 | 38 |
| Sample1 + 0.1% D-sorbitol | 7 | 16 | 38 |
| Sample1 + 0.1% polyvinyl-alcohol | 7 | 18 | 31 |

The invention claimed is:

1. A composition comprising a homopolymer of polytrimethylene terephthalate (PTT) and a melt stable, stabilizing alcoholate compound, wherein the composition is obtained by contacting molten polytrimethylene terephthalate (PTT) resin with the melt stable, stabilizing alcoholate compound to reduce the emission of acrolein from said resin.

2. The composition of claim 1, having an acrolein formation rate at 280° C. of less than 15 ppm/minute.

3. The composition of claim 2, wherein the acrolein formation rate at 280° C. of less than 1 ppm/minute.

4. The composition of claim 3, wherein the acrolein formation rate at 280° C. of less than 0.1 ppm/minute.

5. The composition of claim 1, wherein the residual acrolein content is less than 10 ppm.

6. The composition of claim 5, wherein the residual acrolein content is less than 1 ppm.

7. The composition of claim 6, wherein the residual acrolein content is less than 0.1 ppm.

8. The composition of claim 1 wherein the alcoholate is added in an amount of 10–30.000 ppm based on the total weight of the PTT resin.

9. The composition of claim 1, wherein the alcoholate compound to be added is aluminum-methanolate.

10. The composition according to claim 9 further comprising at least one of a melt stable organic compound selected from the group consisting of poly-functional alcohols, anhydrides of carboxylic acids, carboxylic acids and their salts, carbohydrates and derivates of carbohydrates is added.

11. The composition according to claim 10 wherein the at least one melt stable organic compound is added in an amount of 10–30.000 ppm based on the total weight of the PTT resin.

12. The composition according to claim 10 wherein the melt stable organic compound to be added is trishydroxymethylpropane, pentaerythrite, sorbitol or polyvinyalcohol.

13. The composition according to claim 10 wherein the organic compound to be added is an anhydride of an aromatic carboxylic acid.

14. The composition according to claim 13 wherein the organic compound to be added is phthalic anhydride, isophthalic anhydride or pyromellitic dianhydride.

15. The composition according to claim 10 wherein the organic compound to be added is zinc-acetate.

16. The composition of claim 1, having an intrinsic viscosity of greater than 0.7 dl/g.

17. The composition of claim 1, containing one or more polymer stabilizers selected from the group consisting of phosphorous acid, phosphoric acid, alkylesters of phosphoric acid, hydroxyalkylester of phosphoric acid, diphosphites and phosphonic acids in a concentration of 1–200 ppm as phosphorus in the substances.

18. The composition of claim 17 wherein the phosphonic acid is selected from 2-carboxyalkylphosphonic acid, 2-hydroxyalkylphosphonic acid, 2-aminoalkylphophonic acid and the alkyl group is selected from methyl, propyl, butyl, pentyl and hexyl.

19. The composition of claim 1 containing thermo-oxidative polymer stabilizers as phenolic antioxidants, such as hindered phenolic compounds in concentrations of 0.1–3% by weight.

20. The composition of claim 1 having been subjected to a solid-state polycondensation reaction in an inert-gas atmosphere.

21. A method for preparing the composition according to claim 1 wherein the melt stable stabilizing alcoholate compound and optionally the melt stable organic compound selected from the group consisting of polyfunctional alcohols, anhydrides of carboxylic acids, carboxylic acids and their salts, carbohydrates and derivates of carbohydrates and optionally said thermo-oxidative stabilizers and optionally antioxidants are added to the polymer in molten state and optionally to the resin, which is then processed to fibers, filaments, non-wovens, films or mouldings.

22. An article of manufacture selected from fabrics, knittings and carpets made from filament yarns, staple fibers, bulked crimped yarns (BCF) and non-wovens comprising the composition of claim 1.

* * * * *